United States Patent
Kim et al.

(10) Patent No.: US 8,086,872 B2
(45) Date of Patent: Dec. 27, 2011

(54) METHOD FOR SETTING SECURITY CHANNEL BASED ON MPCP BETWEEN OLT AND ONUS IN EPON, AND MPCP MESSAGE STRUCTURE FOR CONTROLLING FRAME TRANSMISSION

(75) Inventors: Kwang Ok Kim, Jeonju (KR); Yool Kwon, Busan (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1027 days.

(21) Appl. No.: 11/607,371

(22) Filed: Dec. 1, 2006

(65) Prior Publication Data
US 2007/0133800 A1    Jun. 14, 2007

(30) Foreign Application Priority Data

Dec. 8, 2005 (KR) .................. 10-2005-0119323
Mar. 24, 2006 (KR) .................. 10-2006-0027147

(51) Int. Cl.
*G06F 11/30* (2006.01)

(52) U.S. Cl. ........ 713/191; 713/150; 713/151; 713/152; 713/153; 713/189; 713/190; 380/28; 380/29; 380/30; 380/255; 380/256; 380/257; 726/26; 726/27; 726/28; 726/29; 726/30

(58) Field of Classification Search .............. 380/28–30, 380/255–257; 713/160–163, 150–153, 189–193; 726/26–33

See application file for complete search history.

(56) References Cited

U.S. PATENT DOCUMENTS

| 2003/0131228 | A1* | 7/2003 | Twomey | 713/153 |
| 2004/0028409 | A1 | 2/2004 | Kim et al. | |
| 2004/0073788 | A1 | 4/2004 | Kim et al. | |
| 2005/0008158 | A1 | 1/2005 | Huh et al. | |
| 2005/0201554 | A1* | 9/2005 | Kramer et al. | 380/28 |

FOREIGN PATENT DOCUMENTS

| JP | 2000-228668 | 8/2000 |
| JP | 2004-180183 | 6/2004 |
| KR | 2000-0034000 | 6/2000 |
| KR | 10-2003-0088643 | 11/2003 |
| KR | 10-2005-0006613 | 1/2005 |
| WO | WO-2005-096542 | 10/2005 |

\* cited by examiner

*Primary Examiner* — Taghi Arani
*Assistant Examiner* — Josnel Jeudy
(74) *Attorney, Agent, or Firm* — Sherr & Vaughn, PLLC

(57) ABSTRACT

Provided is a method for setting a security channel between an OLT and at least one ONU in an EPON. In detail, a channel is generated by which the OLT makes a reciprocal security capability agreement with the ONU that wants to set a security channel in a discovery interval and then automatically registers the ONU with the security capability agreement. The security channel is set by which the OLT distributes an encryption key for the security with the ONU completed with the security capability agreement. A renewal point of the encryption key is shared by transmitting a message indicative of a time to change the encryption key between the OLT and the ONU both completed with the encryption key distribution.

15 Claims, 8 Drawing Sheets

| Type | OP Code | Message |
|---|---|---|
| 600 — KEY_Request Message | 0x0007 | Nonce |
| 601 — Encryption_ KEY Message | 0x0008 | SA Number+128bits KEY+64bit IV |
| 602 — KEY_Register_ ACK Message | 0x0009 | SA Number+128bits KEY+64bit IV |
| 603 — KEY_Change_ Time Message | 0x000a | 32bits Sequence Number(or PN) |

FIG. 8

METHOD FOR SETTING SECURITY CHANNEL BASED ON MPCP BETWEEN OLT AND ONUS IN EPON, AND MPCP MESSAGE STRUCTURE FOR CONTROLLING FRAME TRANSMISSION

RELATED APPLICATION

The present application is based on, and claims priority from, Korean Application Number 2005-119323, filed Dec. 8, 2005, and Korean Application Number 2006-27147, filed Mar. 24, 2006, the disclosure of which is hereby incorporated by reference herein in its entirety.

BACKGROUND OF THE INVENTION

1. Field of the Invention

The present invention relates to an Ethernet passive optical network (EPON), and more particularly, to a method for setting a security channel based on a multi-point control protocol (MPCP) between an optical line terminator (OLT) and optical network units (ONUs) in an EPON, and a MPCP message structure for controlling frame transmission.

2. Description of the Related Art

In 2004, an IEEE802.3ah Ethernet in the First Mile (EFM) working group, which is an Ethernet transmission technology standardization association, standardized EPON technology to efficiently provide a broadband to users. The EPON technology uses conventional Ethernet transmission technology and additionally uses an EPON media access control (MAC) function to control frame transmission in the EPON. In the EPON, a single OLT is connected to multiple ONUs based on a point-to-multipoint mode. The single OLT and the multiple ONUs exchange frames without any collision through frame transmission using broadcasting scheme for downstream transmission and using TDMA scheme for upstream transmission.

The IEEE802.3ah EFM working group defines five types of MPCP messages to control the frame transmission. The MPCP messages include a discovery message (GATE), a register request message (REGISTER_REQUEST), a register message (REGISTER), a register acknowledgement message (RESIGSTER_ACK), and a report message (REPORT).

The discovery message (GATE) is used to transfer an instruction (Discovery Window Open) for opening a discovery window and a time for using an upstream channel of each ONUs when the ONUs are initially registered. The report message (REPORT) is used to inform the OLT of the size of data on standby at the ONUs. The register request message (REGISTER_REQUEST) is used for the ONUs to express their registration intention to the OLT within the discovery window. The register message (REGISTER) is used to confirm whether ONUs are successfully registered or not after r an OLT receives the registration intention from the ONUs. The register acknowledgement message (REGISTER_ACK) is transmitted from the ONUs to OLT in order to transmit information that the ONU confirms the registering state of the OLT to the OLT.

The OLT in the EPON performs an automatic registration procedure to find out the existence of the ONUs and controls upstream data transmission of the ONUs using the MPCP messages. In the automatic registration procedure, the OLT ranges the distance of the ONUs and allocates EPON identifiers (PHY ID) to the ONUs.

FIG. 1 is a block diagram illustrating downstream message transmission between an OLT and an ONU in an EPON according to the related art.

As shown in FIG. 1, the OLT 10 is connected to ONUs 32, 34, and 36 through an optical cable. The ONUs 32, 34, and 36 are installed inside home or offices and receives various services, such as Internet services, telephone services and interactive video services, from the OLT 10.

In the EPON, Ethernet frames 22, 24, 26, and 28 including data for various services are transmitted to the individual ONUs 32, 34, and 36 from the OLT through an 1:N passive optical distribution unit such as a splitter or coupler. Each of the Ethernet frames 22, 24, 26, and 28 is created as a variable length packet having a maximum length of 1,518 bytes and includes information about the destination ONUs 32, 34, and 36. Upon receiving the above packets, each of the ONUs 32, 34, and 36 accepts only the packets corresponding to itself and discards the other packets, and then transmits the accepted packets to the corresponding users 52, 54, and 56, respectively.

FIG. 2 is a block diagram showing upstream message transmission from ONUs to an OLT in an EPON according to the related art.

As shown in FIG. 2, a plurality of users 52, 54, and 56 transmit frames 40, 41, 43, 46, 47 and 48 to the corresponding ONUs 34, 34, and 36, respectively. The ONUs 32, 34, and 36 load the corresponding frames onto respective time slot intervals 42, 44 and 49 allocated by an OLT 10 in advance, and transmit the loaded frames to the OLT 10 through an optical cable.

In the aforementioned EPON, the multiple ONUs share the optical cable, which is a single transmission medium, to perform data transmission/reception with the OLT 10. Therefore, an MAC protocol is required for the multiple ONUs to effectively access the transmission medium. According to such a requirement, the MPCP in the EPON uses a TDMA based mechanism to effectively transmit the upstream data between the multiple ONUs and the single OLT.

The main function of the MPCP is to control a discovery procedure of the OLT to discover ONUS, allocate time slots to the respective ONUS, and provide the timing reference of the OLT and ONUs.

Since the EPON is usually configured in a point-to-multipoint connection, the downstream frame transmission is performed in a broadcasting mode. Hence, network intruder, hackers, may easily see the frames that are transmitted to the ONUs through simple program manipulation.

However, the IEEE802.3ah EPON working group does not define any standard for a channel security function, only recommends the IEEE802.1ae MAC security specification to use if it is required to provide the channel security function in the EPON. Accordingly, the currently used MPCP messages for performing the transmission control do not include any information for providing the security for the links of the EPON.

As a result, when the IEEE801.ae MAC security specification is used in the EPON, an additional key distribution protocol is required for negotiating and setting of a security channel. However, the additional key distribution protocol may cause the waste of the bandwidth by transmitting additional overhead frames.

Also, the ONU need to have a central processing unit (CPU) to operate the key distribution protocol. Without the CPU, the key distribution protocol cannot be operated. In order to provide the channel security function in the EPON, the ONUs are registered based on the MPCP, and the OLT negotiates a security capability with the registered ONUs and provides the key distribution to the ONUs.

Hence, there is a demand for a method that can simultaneously registering the ONUs, and negotiating and setting of the security channel using the MPCP function, which is a transmission control mechanism defined as a standard in EPON, without using the additional key distribution protocol. Furthermore, there is also demand for a key distribution method using the aforementioned method. The OLT should be capable of setting the security channel for the ONUs that do not have the CPU and providing an encryption function.

FIG. 3 is a flowchart for a session key distribution method for providing a security service through the MPCP in the conventional EPON.

As shown, the OLT 10 periodically multicasts a discovery gate message GATE in plain text to perform a procedure of discovering a destined ONU 30 at step S11. The discovery gate message GATE allocates a time slot GRANT to allow a new ONU 30 to be registered. The discovery gate message GATE includes a predetermined value, i.e., time stamp, $E_{KROLT}[N1]$ that is encoded using a secret key of the OLT for signature, the capability of the OLT capabilities, and a public key KUOLT.

When the new destined ONU 30 receives the discovery gate message GATE, the ONU 30 transmits a register request message REGISTER_REQUEST to the OLT 10 as a response to the discovery gate message GATE at step S13. The register request message REGISTER_REQUEST includes the capability of a physical layers PHY ID capa., the capability of the ONU 30 ONU capa., the capability of the OLT 10 echo of OLT capa., a session key $E_{KUOLT}$ [SESSION KEY] that is encoded by the public key of the OLT 10, a predetermined value N1 that is decoded by the public key of the OLT 10, and another predetermined value N2 that is generated for the signature of the ONU 30. The fields of the registration request message REGISTRATION_REQUEST are encoded by a session key excepting fields encoded by the public key of the OLT 10.

At step S15, the OLT 10 decodes the transmitted register request message REGISTER_REQUEST using the session key, and then, transmits a register message (REGISTER) to the ONU 30 in order to notify that the ONU 30 is registered.

The register message REGISTER includes a permanent MAC address dest_addr=ONU MAC addr of the ONU 30, a physical layer ID list PHY ID list, the capability of the ONU 30 echo of ONU capa., and the other predetermined value N2 for the signature of the ONU 30.

At step S17, the OLT 10 transmits a general gate message GATE to the ONU 30 for an upstream transmission of the ONU 30. The general gate message GATE includes the permanent MAC address of the ONU 30 dest_addr=ONU MAC addr and a time slot allocation field GRANT to allocate a time slot. The general gate message GATE is encoded by the session key.

At step S19, the ONU 30 transmits a registration acknowledgement message REGISTER_ACK to the OLT 10 as a response to the register message REGISTER transmitted from the OLT 10. The register acknowledgement message REGISTER_ACK includes the session key $E_{KUOLT}$[SESSION KEY] that is encoded by the public key of the OLT 10 and the IDs of the registered physical layers echo of registered PHY ID. The register acknowledgement message REGISTER_ACK is encoded by the session key and then transmitted to the OLT 10. On the basis of the above sequential operations, the session key is distributed.

However, the conventional session key distribution method may have several drawbacks. First, ONUs that do not have the key distribution algorithm may not be registered because the ONUs can interpret a coded portion encoded by the OLT only if a key distribution algorithm is provided to the ONU. This registration disablement violates a standardized discovery procedure defined for EPON.

Second, the same type of the key distribution algorithm must be provided to all ONUs connected to the single OLT. As a result, it may be difficult to effectively operate the key distribution protocol.

Third, during the key distribution procedure, the multiple ONUs encode the session keys of the ONUs using the public key of the OLT and then, encode all of the fields using the session keys of the ONUs. These two steps of encryption usually make a key distribution protocol structure complex.

Last, since the transmitted different types of the MPCP message are encoded by the session keys and the public key, the ONUs that have the key distribution protocol and the typical ONUs that do not have the same are not allowed to exist on the same line.

SUMMARY OF THE INVENTION

Accordingly, the present invention is directed to a method for setting a security channel based on an MPCP between OLT and ONUs in an EPON, and an MPCP message structure for controlling a frame transmission that substantially obviates one or more problems due to limitations and disadvantages of the related art.

An object of the present invention is to provide a method for setting a security channel to provide an encoded service between an OLT and ONUs using an MPCP in an EPON, and an MPCP message structure for controlling a frame transmission.

Another object of the present invention is to provide a method for setting a security channel and an MPCP message structure for controlling a frame transmission for allowing an OLT to negotiate with ONUs about registration and security capabilities thereof within a discovery interval and providing an encryption function by providing a key distribution.

A further another object of the present invention is to provide a method for setting a security channel and an MPCP message structure for controlling a frame transmission for allowing an OLT to remotely allocate security capabilities and keys for ONUs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for setting a security channel between an optical line terminator (OLT) and at least one optical network unit (ONU) in an Ethernet passive optical network (EPON), the method including the steps of: a) at the OLT, generating a channel by negotiating a reciprocal security capability with at least one of ONUs, which want to set a security channel in a discovery interval, using a multi-point control protocol (MPCP) message and various security capability information of the OLT and the ONU and automatically registering the ONU completed with the security capability negotiation; b) at the OLT, setting the security channel by distributing an encryption key for the security to the ONU making an agreement of the security capability negotiation among the ONUs that have been completed with the security capability negotiation and the automatic registration; and c) sharing a renewal point of the encryption key by transmitting a message indicative of a time to change the encryption key between the OLT and the ONU both completed with the encryption key distribution after the setting of the security channel.

According to a first embodiment of the present invention, the step a) may include the steps of: at the OLT, including the security capability information of the OLT into a discovery gate message and transmitting the discovery gate message to discover the ONU; at the ONU, setting a security capability corresponding to the security capability of the OLT and transmitting to the OLT a register request message including the information of the security capability of the OLT if the ONU that has received the discovery gate message is able to accept the information of the security capability of the OLT; at the OLT, receiving the register request message, determining that the ONU has set the security capability according to the security capability of the OLT, and completing the security capability agreement with the ONU; and performing the automatic registration between the OLT and ONU both completed with the security capability negotiation and generating the channel.

According to a second embodiment of the present invention, the step a) may include the steps of: at the OLT, including the security capability information of the OLT into a discovery gate message and transmitting the discovery gate message and used to discover the ONU; at the ONU, transmitting to the OLT a register request message including information on the security capability of the ONU if the ONU that has received the discovery gate message is unable to accept the information of the security capability of the OLT; at the OLT, setting a security capability corresponding to the information on the security capability of the ONU and transmitting to the ONU a register message including the information on the security capability of the ONU if the OLT is able to accept the information on the security capability of the ONU; at the ONU, receiving the register message, determining that the OLT has set the security capability according to the information on the security capability of the ONU, and completing the security capability agreement with the OLT; at the OLT, transmitting a general gate message to the ONU; at the ONU, receiving the general gate message and transmitting a register acknowledgement message to the OLT; at the OLT, receiving the register acknowledgement message and completing the security capability agreement with the ONU; and performing the automatic registration between the OLT and ONU both completed with the security capability agreement and generating the channel.

According to the second embodiment of the present invention, the step a) may further includes the step of, at the OLT, transmitting a register message that does not include the various security capability information of the OLT and the ONU from the OLT to the ONU if the OLT is unable to accept the information on the security capability of the ON.

According to the first embodiment of the present invention, the step b) may include the steps of: at the OLT, transmitting a key request message that requests the encryption key for the security channel to the ONU completed with the security capability agreement; at the ONU, generating an encryption key message using the key request message, transmitting the encryption key message to the OLT and activating an encryption mode; and at the OLT, receiving the encryption key message, activating an encryption mode, encoding a key register acknowledgement message using a stored encryption key, and transmitting the encoded key register acknowledgement to the ONU.

The step b) may further include the steps of: at the ONU, receiving the key register acknowledgement message and decoding the received key register acknowledgement message; maintaining the activation state of the encryption mode if the decoded key register acknowledgement message and the encryption key message are substantially the same; and changing the encryption mode from the activation state to an inactivation state if the decoded key register acknowledgement message and the encryption key message are not the same.

According to the second embodiment of the present invention, the step b) may include the steps of: at the ONU that has completed with the security capability negotiation, transmitting a key request message that requests the encryption key for the security channel to the OLT; at the OLT, receiving the key request message, generating an encryption key message using the key request message, encoding the encryption key message using a master key, and transmitting the encryption key message to the ONU; and at the ONU, receiving the encryption key message and selectively activating or deactivating the encryption mode according to the result whether the ONU decodes the received encryption key message successfully or not; and at the ONU, encoding a key register acknowledgement message using the received encryption key and transmitting the key register acknowledgement message to the OLT.

The step b) may further include the step of selectively activating or deactivating the encryption mode according to the result whether the OLT that has received the key register acknowledgement message decodes successfully or not.

The MPCP message may include over-header information, an OPCODE, a time stamp, a parameter list including the security capability information, and field check sequence information.

The security capability information may include secure connectivity association information, secure channel association information, security algorithm type information, security mode per frame type information, control parameter information including an encryption function activation mode, almost PN expire value information, and PN change value information.

According to the present invention, the automatic registration of the ONUs can be achieved by the reciprocal security capability agreement between the OLT and the corresponding ONU using the MPCP. Also, using various types of the MPCP message that are newly defined for the key distribution allow effective providing of the key distribution function.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 illustrates various types of key distribution related MPCP message described in FIGS. 6 and 7 according to an embodiment of the present invention.

DETAILED DESCRIPTION OF THE INVENTION

Figure 1:
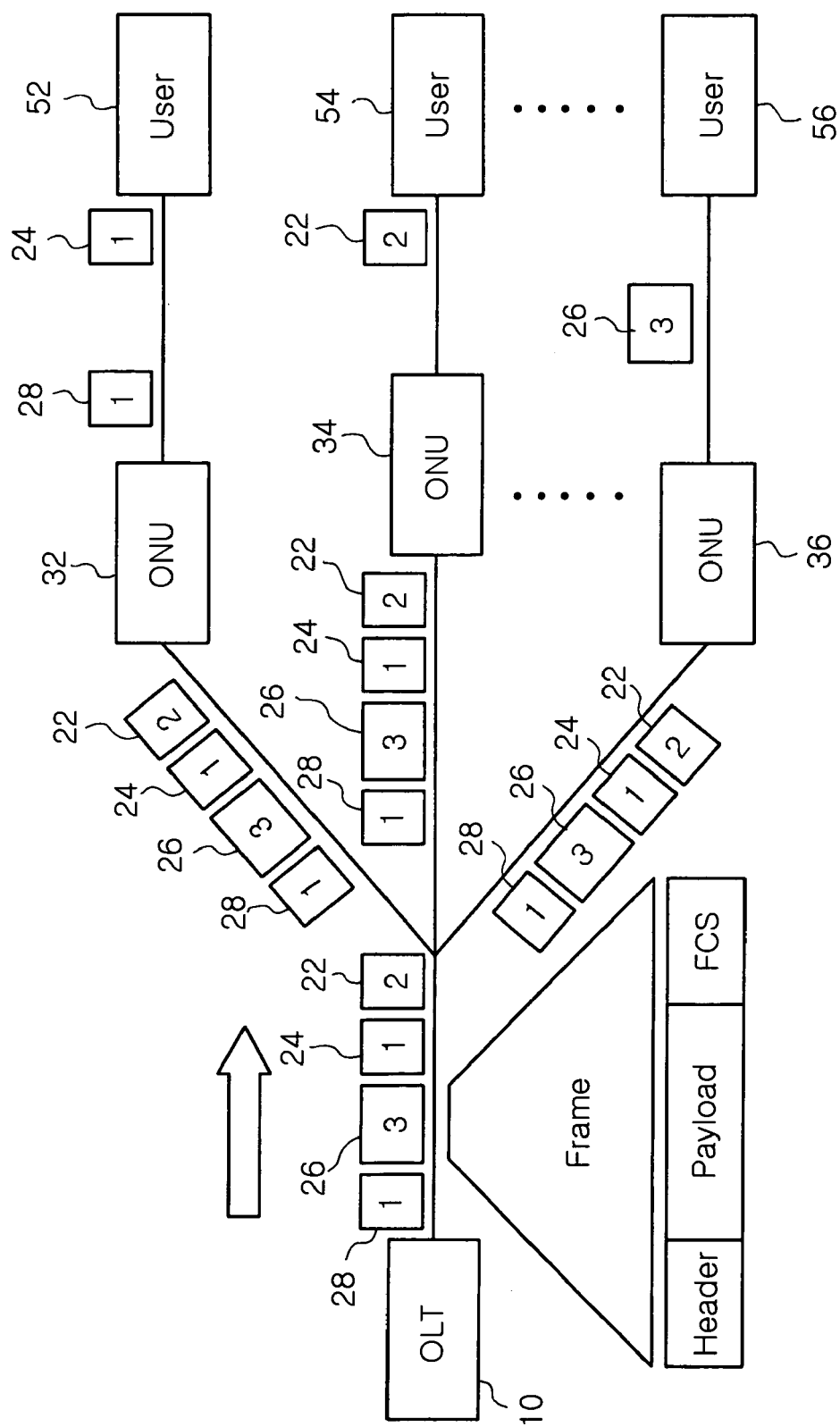
FIG. 1 is a block diagram illustrating downstream message transmission between an OLT and an ONU in an EPON according to the related art.
Figure 2:
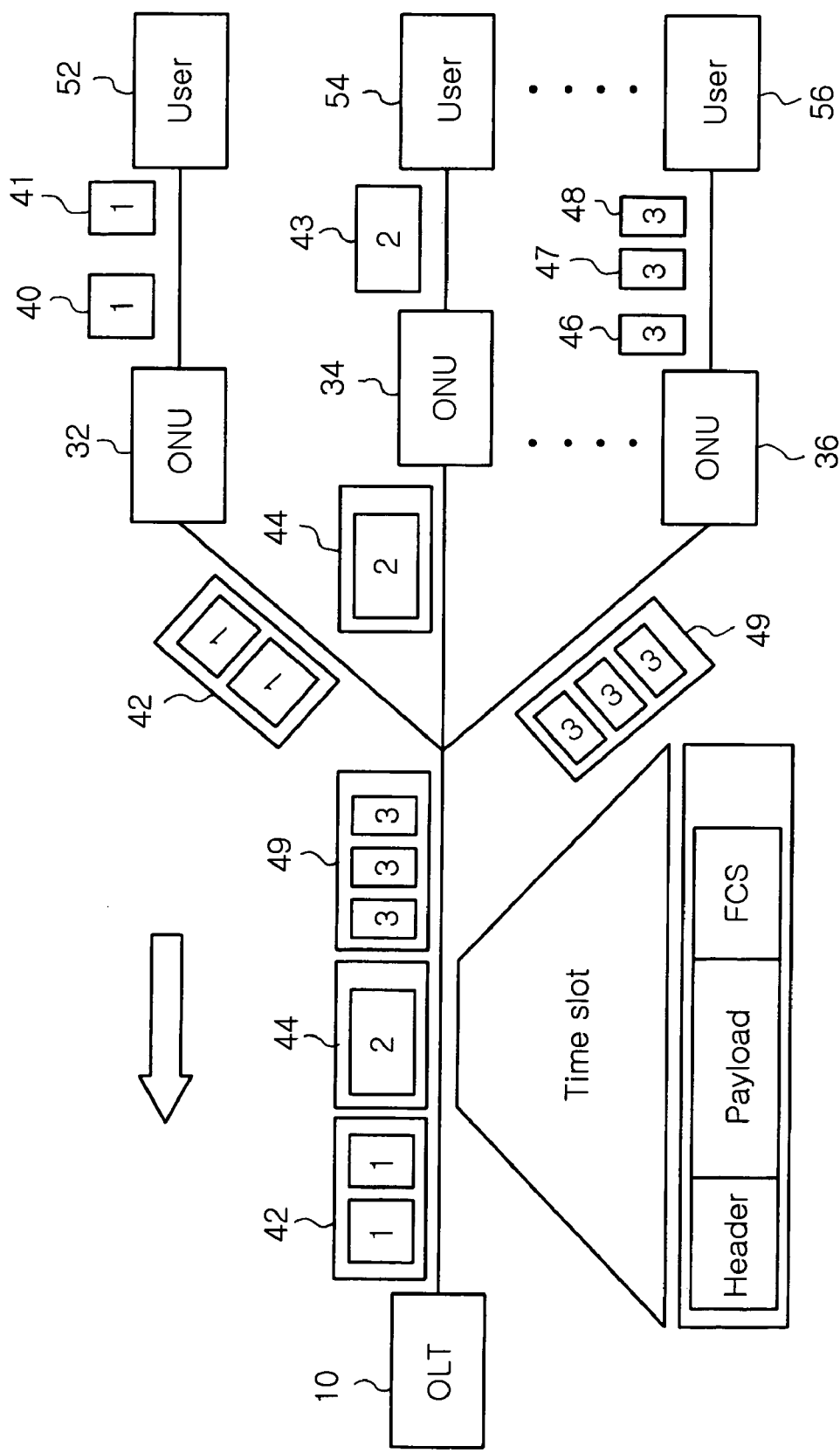
FIG. 2 is a block diagram showing upstream message transmission from ONUs to an OLT in an EPON according to the related art.
Figure 3:
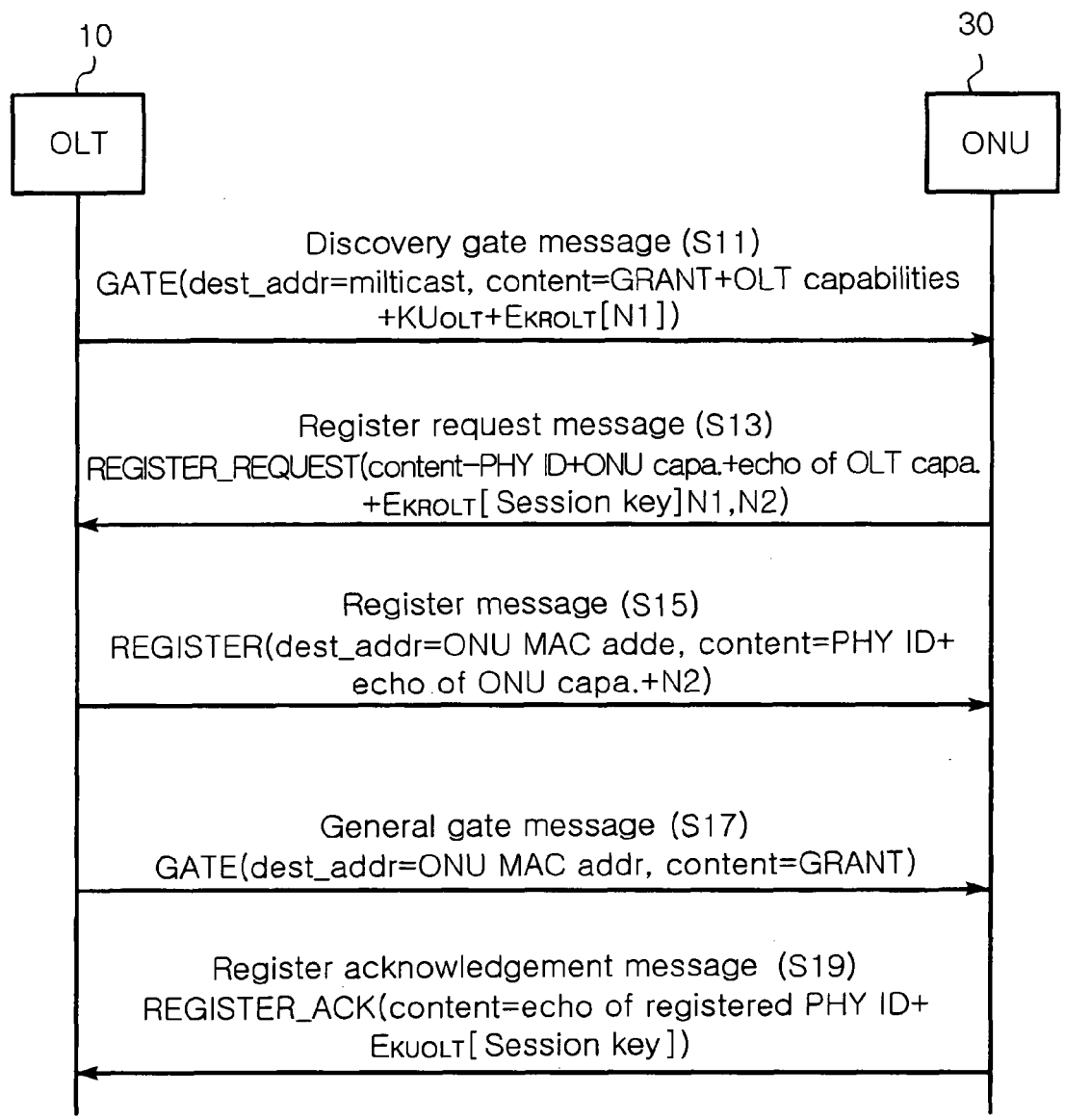
FIG. 3 is a flowchart for a session key distribution method for providing a security service through the MPCP in the conventional EPON.

Reference will now be made in detail to the preferred embodiments of the present invention, examples of which are illustrated in the accompanying drawings. Like reference numerals denote like elements in different drawings. Detailed description of the known functions and configuration, which may be deviated from the concerned scope and spirit of the present invention, will be omitted.

Figure 4:
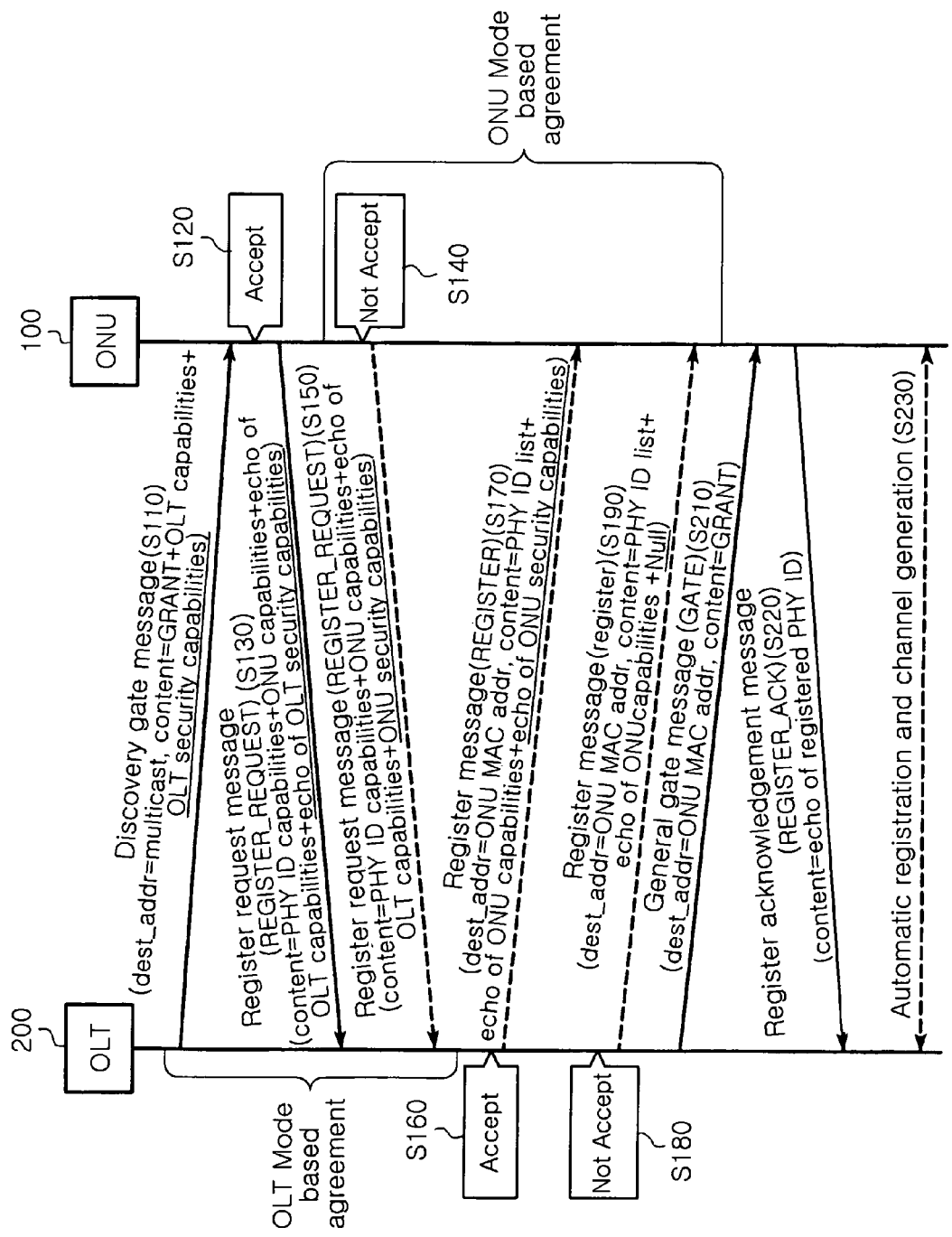
FIG. 4 is a flowchart of a method of registering and negotiating a security capability between an OLT and ONUs to set a security channel in an EPON according to an embodiment of the present invention.

FIG. 4 is a flowchart of a method of registering and negotiating a security capability between an OLT and ONUs to set a security channel in an EPON according to an embodiment of the present invention. Particularly, FIG. 4 illustrates steps for registering ONUs and negotiating the security capability at the same time by adding a 12 bits security capability field in a MPCP message defined in a standardized IEEE802.3ah EPON.

As shown in FIG. 4, when a discovery window is opened, the OLT 200 transmits a discovery gate message GATE to discover the ONUs similar to the standardized method at step S110. Since the OLT 200 does not know the existence of the ONUs, a multicast address dest_addr=multicast is used as a destination address. The discovery gate message GATE includes the 6-byte timeslot allocation information GRANT for a new ONU 100 to respond to the discovery gate message GATE, the capability OLT capability, and the 12-byte security capability information OLT Security Capabilities to set a security function to the ONU 100. The 12-byte security capability information (OLT Security Capabilities) includes an encryption channel type, an encryption algorithm type, an encryption mode per frame type, and other parameters.

The newly destined ONU 100, which receives the discovery gate message GATE, sets an upstream transmission time using the timeslot allocation information. At the transmission time, the ONU 100 requests an intended number of IDs of physical layers (PHY ID) using a register request message REGISTER_REQUEST at step S130. At this time, the register request message REGISTER_REQUEST uses a source point MAC address of the ONU 100. The register request message REGISTER_REQUEST includes capabilities of the physical layer ID (PHY ID capa.), capability of the ONU 100 (ONU capa.), capability of the OLT 200 (echo of OLT capa.), and security capability of the OLT 200 (echo of OLT Security Capabilities).

Meanwhile, the ONU 100 checks whether the security capability information received from the OLT 200 can be set. If the ONU 100 can set the OLT security capability information requested by the OLT 200, the ONU 100 sets the security capability of the OLT 200 at step S120. Also, using the register request message REGISTER_REQUEST, the ONU 100 transmits again to the OLT 200 the OLT security capability information that has requested by the OLT 200, thereby completing the security agreement at step S130.

If the security capability field of the register request message REGISTER_REQUEST includes the security capability information of the OLT 200, the OLT 200 determines that the ONU 100 normally satisfies the security setting request for the OLT 200. Then, the security capability negotiation with the ONU 100 is completed.

If the ONU 100 cannot set the OLT security capability information requested by the OLT 200 at step S140, the ONU 100 transmits the security capability information of the ONU 100 to the OLT 200 using the register request message REGISTER_REQUEST at step S150. If the ONU 100 does not provide the security function, the ONU security capability information is not transmitted.

After receiving the register request message REGISTER_REQUEST including the ONU security capability information that has transmitted from the ONU 100 at step S150, the OLT 200 determines that the ONU 100 does not satisfy the security setting request made by the OLT 200, and thus, the OLT 200 checks whether the OLT 200 can accept the security capability requested by the ONU 100.

If the OLT 200 can set the security capability of the ONU 100 at step S160, the OLT 200 sets the security capability corresponding to the ONU security capability information. At step S170, the OLT 200 transmits to the ONU 100 information about the security capability of the ONU 100 that is set by the OLT 200 using a register message REGISTER. Then, the security capability negotiation of the OLT 200 with the ONU 100 is completed. At this time, the OLT 200 transmits the ONU security capability information to the ONU 100 along with allocating the IDs of the physical layers to the source point MAC address of the ONU 100.

If the OLT 200 cannot set the security capability of the ONU 100 at step S180, the OLT 200 transmits a register message that does not include the security capability information to the ONU 100. As a result, at step S190, the security function is not provided to the ONU 100.

The OLT 200 transmits the register message REGISTER that instructs the allocation of the IDs of the physical layers to the ONU 100 in the step S170. Afterwards, at step S210, the OLT 200 transmits a general gate message GATE to the ONU 100 to provide an upstream transmission of the ONU 100. The general gate message GATE includes information on allocation of a transmission time for a register acknowledgement message REGISTER_ACK that verifies whether the ONU 100 normally receives the transmitted register message REGISTER in the operation of S170, and the IDs of the physical layers are allocated.

When the ONU 100 receives the transmitted register message REGISTER in the operation of S170, the ONU 100 stores the IDs of the physical layers included in this register message REGISTER into a register. If the ONU security capability information is included in the received register message REGISTER, the ONU 100 determines that the OLT 200 sets the security capability of the ONU 100 according to the provided ONU security capability information and completes the security capability negotiation. If the register message REGISTER, which is transmitted at the step S190, does not include the security capability information, the ONU 100 determines that the OLT 200 does not set the security capability. As a result, the security function is not applied.

At step S220, when the ONU 100 receives the general gate message GATE that is transmitted at the step S210, the ONU 200 sets an upstream transmission time, and at the upstream transmission time, transmits the register acknowledgement message REGISTER_ACK to the OLT 200 as a response to the receipt of the IDs of the physical layers.

After receiving the register acknowledgement REGISTER_ACK, the OLT 200 determines that the IDs of the physical layers are allocated normally to the ONU 100, and the OLT 200 completes the automatic registration of the ONU 100 and generates a channel at step S230.

Figure 5:
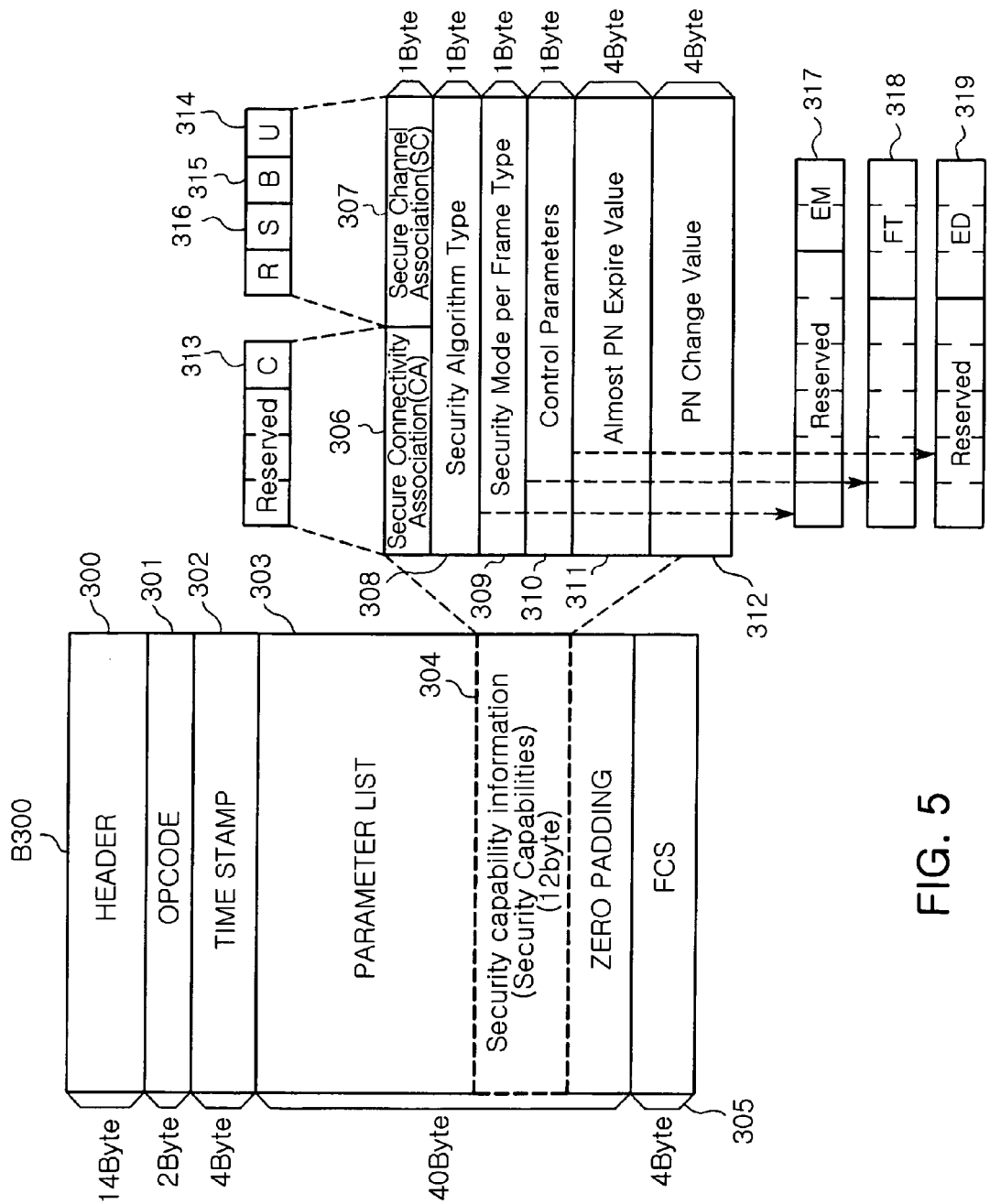
FIG. 5 illustrates a frame structure of the standard MPCP message illustrated in FIG. 4 with the inner structure of the security capability field.

FIG. 5 illustrates a frame structure of the standard MPCP message illustrated in FIG. 4 with the inner structure of the security capability field.

As shown, the standard MPCP message B300 is composed of 64 bytes. The 14-byte of header information 300 includes a 6-byte destination address, a 6-byte source address and a 2-byte MPCP message Ethernet type information. A 2-byte OPCODE 301 is used as an identifier of the MPCP message. A 4-byte time stamp 302 is used as a transmission time unit. A 40-byte parameter list 303 includes different information for each MPCP message. Particularly, the 40-byte parameter list 303 includes the 12-byte security capability field 304 as illustrated in the embodiment of the present invention.

The 12-byte security capability field 304 is configured with various channel information including a secure connectivity association (CA) information 306 and a secure channel (SC) association information 307, a security algorithm type 308, a security mode per frame type 309, control parameters 310 (e.g. a security mode per security function), an almost PN expire value 311, and a PN change value 312.

The 4-byte CA information 306 denotes security algorithm types that can be implemented between the OLT 200 and the ONU 100 and provides four types of the security algorithms in bit maps. More specifically, when the OLT 200 and the ONU 100 use substantially the same algorithm, the CA information is set. Currently, a GCM-AES algorithm can be set according to the IEEE802.1ae standard. In the present embodiment, if a bit C 313 has a value of '1', the bit C 313 represents that the GCM_AES algorithm is used. On the other hand, '0' of the bit C 313 denotes that the GCM_AES algorithm is not used.

The 4-byte SC information 307 is used to indicate whether the security function is to be implemented for unicast and broadcast channels. Also, the 4-byte SC information indicates whether the security capability field 304 is for use in the OLT or ONU. More specifically, a bit U 314 represents a state of the security setting for the unicast channel, and a bit B 315 represents a state of the security information for the multicast channel. If a bit S 316 has a value of '1', the bit S 316 is indicative of the security capability information for use in the OLT. On the other hand, if the bit S 316 has a value of '0', the bit S 316 is indicative of the security capability information for the ONU.

The 1-byte security algorithm type information 308 is used to set an encryption mode between the OLT and the ONU. This usage for the encryption operation mode is illustrated in Table 1 below.

TABLE 1

| Encryption mode (EM) bits | MODE |
| --- | --- |
| 00 | Authentication Encryption |
| 01 | Authentication Decryption |

TABLE 1-continued

| Encryption mode (EM) bits | MODE |
| --- | --- |
| 10 | Authentication Generation |
| 11 | Authentication Check |

Also, the 1-byte security mode per frame type information 309 is used to individually encode various types of frames transmitted from the EPON. That is, if a bit FT 318 has a value of '1', the encoding proceeds. On the other hand, the encoding does not proceed if the bit FT 318 has a value of '0'. Table 2 below illustrates this usage for the security mode per frame type.

TABLE 2

| Bit FT | FT(2) | FT(1) | FT(0) |
| --- | --- | --- | --- |
| Frame Type | MPCP frame | OAM frame | Data frame |

The 1-byte control parameter information 310 is used to activate or inactivate the internal security function. For instance, if a bit ED 319 has a value of '1', the internal security function is activated. On the other hand, if the bit ED 319 has a value of '0', the internal security function is inactivated. This functional control information is illustrated in Table 3 below.

TABLE 3

| Bit ED | ED(2) | ED(1) | ED(0) |
| --- | --- | --- | --- |
| Function Type | Authentication check | Replay attack check | DoS attack check |

The almost PN expire value 311 indicates a moment to request a key necessary for a next cycle after completing the present cycle. The 4-byte PN change value 312 indicates a moment to change the key (i.e., PN) after completing the present cycle. A 4-byte field check sequence (FCS) information 305 provides an error check function for the MPCP frame B300.

Figure 6:
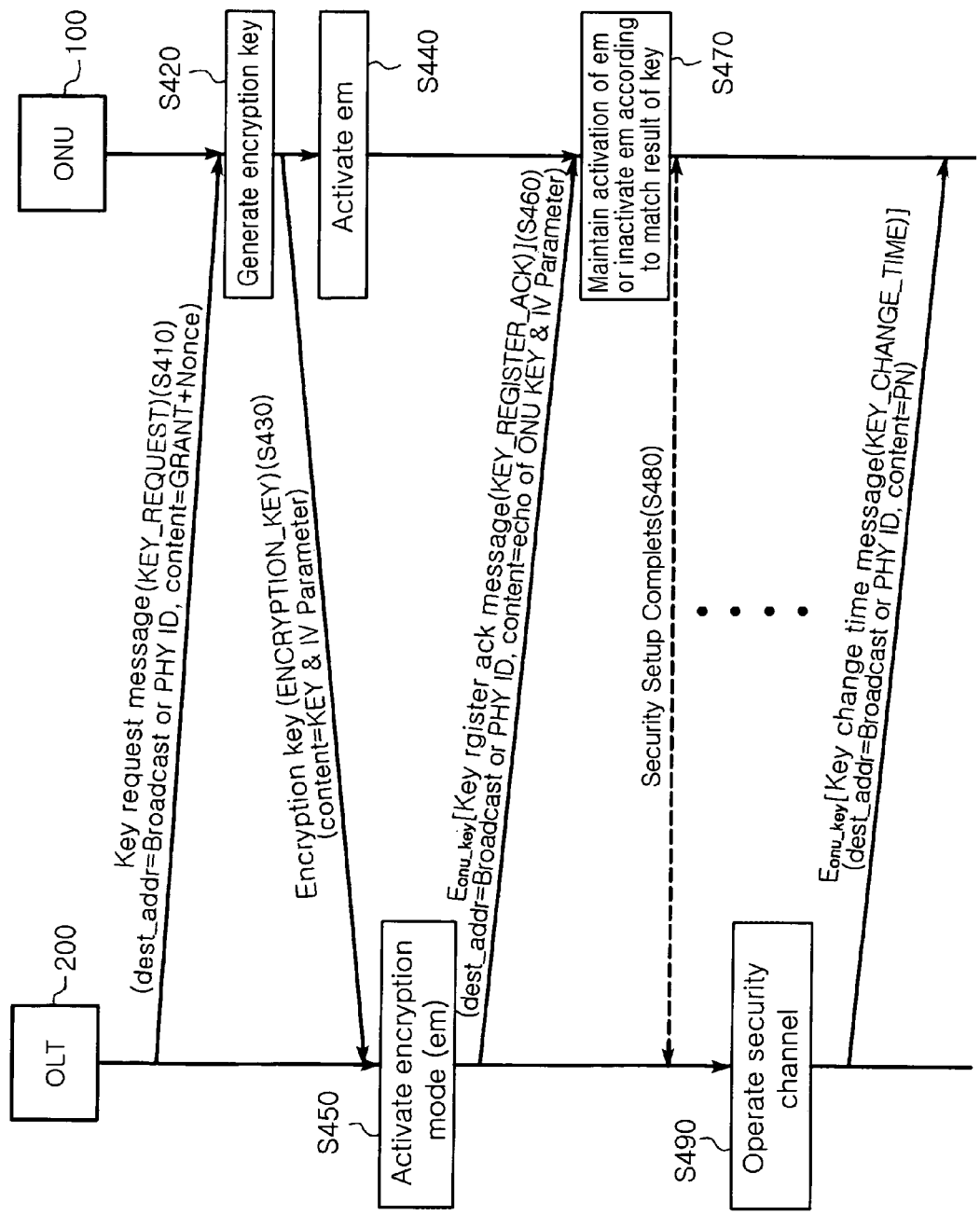
FIG. 6 is a flowchart illustrating steps for distributing a key through an ONU using a key related MPCP message defined to set a security channel in an EPON according to an embodiment of the present invention.

FIG. 6 is a flowchart illustrating steps for distributing a key through an ONU using a key related MPCP message defined to set a security channel in an EPON according to an embodiment of the present invention.

As shown, the key distribution between the ONU 100 and the OLT 200 is performed after the security negotiation and automatic registration procedure described in FIG. 4 is completed. Therefore, the key distribution is applied to those ONUs completed with the security negotiation and automatic registration.

The key distribution procedure is performed as follows. The ONU 100 includes a CPU for the key distribution.

At step S410, the OLT 200 transmits a key request message KEY_REQUEST to the ONUs 100 completed with the security capability agreement. The key request message KEY_REQUEST requests an encryption key to be used in a security channel. The key request message KEY_REQUEST can request the encryption key to all of the ONUs or a specific ONU 100. The key request message KEY_REQUEST provides a nonce used to make random encryption keys at the ONU 100.

When the ONU 100 receives the key request message KEY_REQUEST, the ONU 100 generates an encryption key using the nonce included in the key request message KEY_REQUEST at step S420. The ONU 100 transmits the generated encryption key message ENCRYPTION_Key to the OLT 200 at step S430. The ONU 100 activates a security mode at step S440. The encryption key message ENCRYPTION KEY transmitted to the OLT 200 is not encoded since other ONUs cannot see the encryption key message ENCRYPTION KEY without disconnecting the link due to the topological configuration characteristic of the EPON. One encryption key message ENCRYPTION_KEY provides about 40 bytes of encryption key information at the maximum. The GCM-AES encryption algorithm standardized by the IEEE802.1ae uses about 24 bytes of an encryption parameter for each securing channel, and thus, one encryption parameter can be provided per one message. On the contrary, in case of using an AES encryption algorithm standardized by NIST, about 16 bytes of the encryption parameter are used for each security channel. Thus, about 2 encryption parameters can be provided per one message at the maximum.

Once the OLT 200 receives the encryption key message ENCRYPTION_KEY, the OLT 200 stores the encryption parameters included in the parameter list into a key register and then, activates an encryption mode at step S450. The OLT 200 encodes a key register acknowledgement message KEY_REGISTER_ACK using the stored encryption key and transmits the key register acknowledgement message KEY_REGISTER_ACK to the ONU 100 thereafter at step S460.

The ONU 100 decodes the key register acknowledgement message KEY_REGISTER_ACK. If the decoded message is substantially the same as the encoded parameter of the ONU 100, the encryption mode of the ONU 100 is maintained at step S470, and if otherwise, the encryption mode is inactivated.

At step S480, the encryption modes of the OLT 200 and the ONU 100 are activated, completing the encryption setting. Afterwards, the ONU 100 and the OLT 200 provide the security function for the transmitted frames at step S490. At step S495, the OLT 200 transmits a key change time (or cycle) message KEY_CHANGE_TIME to the ONU 100 to renew a cycle of the distributed key.

Figure 7:
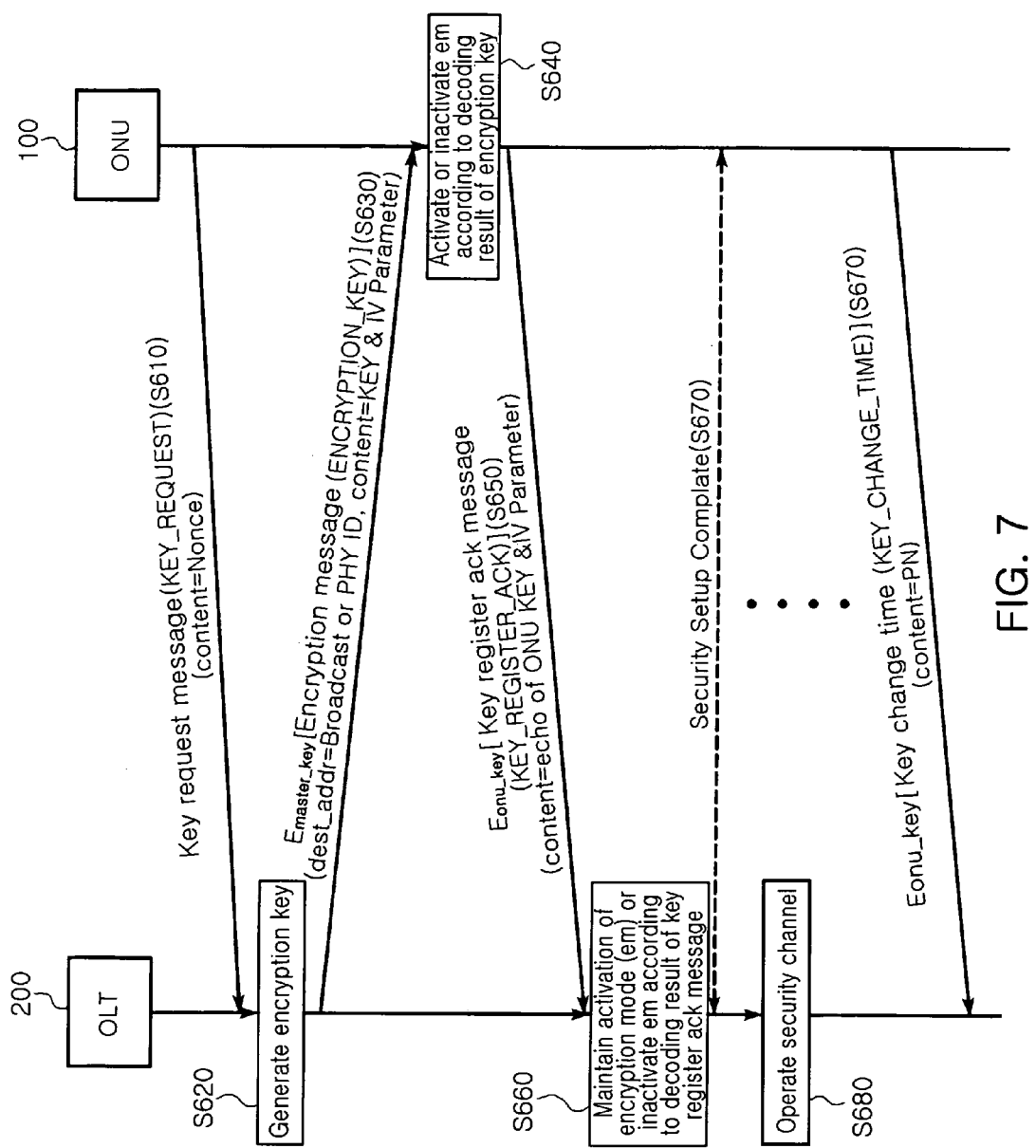
FIG. 7 is a flowchart showing steps for providing a key distribution through an OLT using a key related MPCP message defined for setting a security channel in an EPON according to an embodiment of the present invention.

FIG. 7 is a flowchart showing steps for providing a key distribution through an OLT using a key related MPCP message defined for setting a security channel in an EPON according to an embodiment of the present invention.

As shown in FIG. 7, the key distribution between the OLT 200 and the ONU 100 is performed after the completion of the automatic registration procedure illustrated in FIG. 4. The key distribution procedure is performed as follows. A CPU of the OLT 200 generates and distributes a key. Hence, the ONU 100 does not need to have a CPU to distribute the key.

At step S610, the ONU 100 transmits a key request message KEY_REQUEST that requests an encryption key to be used in the security channel to the OLT 200 completed with the security capability agreement. The key request message KEY_REQUEST provides a nonce used to produce random encryption keys at the OLT 200.

After receiving the key request message KEY_REQUEST, the OLT 200 generates an encryption key using the nonce included in the key request message KEY_REQUEST at step S620. The OLT 200 transmits an encryption key message ENCRYPTION_KEY message that is encoded using a master key to the ONU 100 at step S630. Those downstream frames are likely to be exposed to other ONUs due to the topological configuration characteristic of the EPON, and thus, the encryption key message ENCRYPTION_KEY is transmitted after being encoded using the precedence setting master key of the OLT 200 and the ONU 100. The master key can be used regardless of the activation state of the encryption mode.

At step S640, the ONU 100 receives the encryption key message ENCRYPTION_KEY that has been encoded using the master key and then, decodes the encryption key message ENCRYPTION_KEY. If the decoding is successful, the encryption key is stored into a key register and the encryption mode is activated. If otherwise, the encryption key is not stored and the encryption mode is inactivated.

At step S650, the ONU 100 transmits a key register acknowledgement message KEY_REGISTER_ACK to the OLT 200 using the encryption key message ENCRYPTION_KEY received from the OLT 200.

At step S660, the OLT 200 decodes the encoded key register acknowledgement message KEY_REGISTER_ACK using the key of the ONU 100. If the decoding is successful, the activation state of the encryption mode is maintained. If otherwise, the encryption mode is inactivated.

At step S670, the security setting is completed as the encryption modes of the OLT 200 and the ONU 100 are activated. Afterwards, the OLT 200 and the ONU 100 provide the security function for the transmitted frames at step S680. Then, the ONU 100 transmits an encoded key change time message KEY_CHANGE_TIME that indicates a key change cycle to the OLT 200 at step S690.

FIG. 8 illustrates various types of key distribution related MPCP message described in FIGS. 6 and 7 according to an embodiment of the present invention.

As illustrated, there are four types of the MPCP message associated with the key distribution. More specifically, a key request message KEY_REQUEST 600 requests an encryption key or parameters used in a security channel. An encryption key message ENCRYPTION_KEY 601 transmits the generated encryption key or parameters. A key register acknowledgement message KEY_REGISTER_ACK 602 is used as a response message to the encryption key message ENCRYPTION_KEY 601. A key change time message KEY_CHANGE_TIME 603 indicates a cycle of changing the key.

According to the present invention, the automatic registration of the ONUs can be achieved by the reciprocal security capability negotiation between the OLT and the corresponding ONU using the MPCP. Also, using various types of the MPCP messages that are newly defined for the key distribution allow effective providing of the key distribution function.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk, an optical magnetic disk, and carrier waves such as data transmission through the Internet. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for setting a security channel between an optical line terminator (OLT) and at least one optical network unit (ONU) in an Ethernet passive optical network (EPON), the method comprising the steps of:

a) at the OLT, generating a channel by negotiating, in a discovery interval, a reciprocal security capability with at least one of ONUs which want to set a security channel, using a multi-point control protocol (MPCP) message including various security capability information of the OLT and the ONU and automatically registering the ONU completed with the security capability negotiation;

b) at the OLT, setting the security channel by distributing an encryption key for the security to the ONU making an agreement of the security capability negotiation among the ONUs that have been completed with the security capability negotiation and the automatic registration; and c) sharing a renewal time of the encryption key by transmitting a message indicative of a time to change the encryption key between the OLT and the ONU both completed with the encryption key distribution after the setting of the security channel, wherein the MPCP message includes header information, an OPCODE, a time stamp, and a parameter list including the various security capability information, wherein the various security capability information includes secure connectivity association information, secure channel association information, security algorithm type information, security mode per frame type information, control parameter information including an encryption function activation mode, almost packet number (PN) expire value information, and PN change value information, and wherein the MPCP message including the various security capability information is transmitted and received between the OLT and at least one of ONUs for the security capability negotiation between the OLT and the ONU in the discovery interval.

2. The method of claim 1, wherein the step a) includes the steps of:

at the OLT, including the security capability information of the OLT into a discovery gate message and transmitting the discovery gate message to discover the ONU;

at the ONU, setting a security capability corresponding to the security capability of the OLT and transmitting to the OLT a register request message including the information of the security capability of the OLT if the ONU that has received the discovery gate message is able to accept the information of the security capability of the OLT;

at the OLT, receiving the register request message, determining that the ONU has set the security capability according to the security capability of the OLT, and completing the security capability agreement with the ONU; and performing the automatic registration between the OLT and ONU both completed with the security capability negotiation and generating the channel.

3. The method of claim 1, wherein the step a) includes the steps of:

at the OLT, including the security capability information of the OLT into a discovery gate message and transmitting the discovery gate message and used to discover the ONU;

at the ONU, transmitting to the OLT a register request message including information on the security capability of the ONU if the ONU that has received the discovery gate message is unable to accept the information of the security capability of the OLT;

at the OLT, setting a security capability corresponding to the information on the security capability of the ONU and transmitting to the ONU a register message including the information on the security capability of the ONU if the OLT is able to accept the information on the security capability of the ONU;

at the ONU, receiving the register message, determining that the OLT has set the security capability according to the information on the security capability of the ONU, and completing the security capability agreement with the OLT;

at the OLT, transmitting a general gate message to the ONU;

at the ONU, receiving the general gate message and transmitting a register acknowledgement message to the OLT;

at the OLT, receiving the register acknowledgement message and completing the security capability agreement with the ONU; and performing the automatic registration between the OLT and ONU both completed with the security capability agreement and generating the channel.

4. The method of claim 3, wherein the step a) further includes the step of, at the OLT, transmitting a register message that does not include the various security capability information of the OLT and the ONU from the OLT to the ONU if the OLT is unable to accept the information on the security capability of the ONU.

5. The method of claim 1, wherein the step b) includes the steps of:

at the OLT, transmitting a key request message that requests the encryption key for the security channel to the ONU completed with the security capability agreement;

at the ONU, generating an encryption key message using the key request message, transmitting the encryption key message to the OLT and activating an encryption mode; and at the OLT, receiving the encryption key message, activating an encryption mode, encoding a key register acknowledgement message using a stored encryption key, and transmitting the encoded key register acknowledgement to the ONU.

6. The method of claim 5, wherein the step b) further including the steps of:

at the ONU, receiving the key register acknowledgement message and decoding the received key register acknowledgement message;

maintaining the activation state of the encryption mode if the decoded key register acknowledgement message and the encryption key message are substantially the same; and changing the encryption mode from the activation state to an inactivation state if the decoded key register acknowledgement message and the encryption key message are not the same.

7. The method of claim 1, wherein the step b) includes the steps of:

at the ONU that has completed with the security capability negotiation, transmitting a key request message that requests the encryption key for the security channel to the OLT;

at the OLT, receiving the key request message, generating an encryption key message using the key request message, encoding the encryption key message using a master key, and transmitting the encryption key message to the ONU;

at the ONU, receiving the encryption key message and selectively activating or deactivating the encryption mode according to the result whether the ONU decodes the received encryption key message successfully or not; and at the ONU, encoding a key register acknowledgement message using the received encryption key and transmitting the key register acknowledgement message to the OLT.

8. The method of claim 7, further including the step of selectively activating or deactivating the encryption mode according to the result whether the OLT that has received the key register acknowledgement message decodes successfully or not.

9. The method of claim 1, wherein the MPCP message includes:

a header indicating a destination of a message, a source point of information, and protocol information;

an OPCODE indicating identification information that identifies a message type;

a time stamp used as a unit for a message transmission time;

a parameter list indicating various information required for each message type and including the various security capability information for setting and driving the security channel; and a piece of field check sequence information to check an error in a message transmission.

10. The method of claim 1, wherein in the secure connectivity association information, a lower 1 bit is indicative of usage of the Galois Counter mode of Advanced Encryption Standard (GCM-AES) algorithm used in the Institute of the Electrical and Electronics Engineers (IEEE) Media Access Control (MAC) security standard (IEEE 802.1AE).

11. The method of claim 1, wherein in the secure connectivity association information, lower 2 bits are indicative of a security function setting for a logic link of a unicast and a broadcast, and a third bit indicates whether the security capability information is for the OLT or the ONU.

12. The method of claim 1, wherein in the security algorithm type information, lower 2 bits set an encryption operation mode between the OLT and the ONU.

13. The method of claim 1, wherein in the security mode per frame type information, lower 3 bits indicate whether the encryption is applied individually for different types of frames transmitted in the EPON.

14. The method of claim 1, wherein in the control parameter information including the encryption function activation mode, lower 3 bits set an activation or inactivation state of an internal security function.

15. The method of claim 1, wherein the almost PN expire value information and the PN change value information set a time for requesting the encryption key for a next cycle and a time to change the encryption key for the next cycle.

* * * * *